(12) United States Patent
Kulshrestha et al.

(10) Patent No.: US 10,079,909 B2
(45) Date of Patent: Sep. 18, 2018

(54) COMPUTER IMPLEMENTED METHOD AND SYSTEM FOR PROXY VOTING

(71) Applicant: Invesco Holding Company (US), Inc., Atlanta, GA (US)

(72) Inventors: Vikas Kulshrestha, Hyderabad (IN); Bonnie Saynay, Atlanta, GA (US); Kartik Seksaria, Hyderabad (IN)

(73) Assignee: Invesco Holding Company (US), Inc., Atlanta, GA (US)

( * ) Notice: Subject to any disclaimer, the term of this patent is extended or adjusted under 35 U.S.C. 154(b) by 0 days.

(21) Appl. No.: 15/481,534

(22) Filed: Apr. 7, 2017

(65) Prior Publication Data

US 2017/0346918 A1    Nov. 30, 2017

(30) Foreign Application Priority Data

Apr. 7, 2016   (IN) .............................. 201641012230
Apr. 6, 2017   (IN) .............................. 201641012230

(51) Int. Cl.
G06K 17/00      (2006.01)
H04L 29/08      (2006.01)
G06F 13/10      (2006.01)

(52) U.S. Cl.
CPC ........ *H04L 67/2857* (2013.01); *G06F 13/102* (2013.01); *G06Q 2230/00* (2013.01)

(58) Field of Classification Search
CPC ..... G07C 13/00; G06Q 10/10; G06K 17/0032
USPC ............................................ 235/386; 705/12
See application file for complete search history.

(56) References Cited

U.S. PATENT DOCUMENTS

| 7,953,589 | B1* | 5/2011 | Niebanck | G06F 17/2276 704/2 |
|---|---|---|---|---|
| 2003/0046207 | A1* | 3/2003 | Torre | G06Q 40/02 705/36 R |
| 2005/0288996 | A1* | 12/2005 | Wallman | G06Q 40/00 705/12 |
| 2011/0231199 | A1* | 9/2011 | Cunningham | G06Q 30/08 705/1.1 |

* cited by examiner

*Primary Examiner* — Ahshik Kim
(74) *Attorney, Agent, or Firm* — Alston & Bird LLP

(57) ABSTRACT

A computer implemented method and system for proxy voting are disclosed. The method includes accessing a proxy admin system for casting a plurality of votes, clicking on a delegate button in the proxy admin system for selecting at least one fund, searching for a plurality of vote meetings of the fund manager on a vote card list screen, clicking on a quick vote for selecting a plurality of appropriate policies; a plurality of meetings and a plurality of comments and clicking on a vote button for successful voting in the proxy admin system.

19 Claims, 19 Drawing Sheets

Proxy votes Due For : Abhi Gami     4/5/2016   3:00:40AM

| Meeting ID | IVZ Meeting Cut-Off Date(GMT) | IVZ Meeting Cut-Off Date(CST) | Issuer Name | Ticker | Meeting Type | D Flag | Is COI | Is Top 25 | ISS Rec | GL Rec | Merger | Acquisition |
|---|---|---|---|---|---|---|---|---|---|---|---|---|
| 1034824 | 2016-04-05 21:00:00 | 2016-04-05 16:00:00 | Carnival Corporation | CCL US | Annual | N | N | [Y] | Y | Y | N | N |
| 1034946 | 2016-04-05 21:00:00 | 2016-04-05 16:00:00 | WHIRLPOOL CORPORATION | WHR US | Annual | N | N | N | Y | Y | N | N |
| 1035434 | 2016-04-06 21:00:00 | 2016-04-06 16:00:00 | THE SHERWIN-WILLIAMS COMPANY | SHW US | Annual | N | N | N | Y | Y | N | N |
| 1036957 | 2016-04-10 21:00:00 | 2016-04-10 16:00:00 | Honeywell International Inc. | HON US | Annual | [Y] | N | N | Y | Y | N | N |
| 1037891 | 2016-04-13 21:00:00 | 2016-04-13 16:00:00 | Under Armour, Inc. | UA US | Annual | N | N | N | Y | Y | N | N |
| 1041062 | 2016-04-14 03:59:00 | 2016-04-13 22:59:00 | Jarden Corporation | JAH US | Annual | [Y] | N | N | Y | Y | Y | N |
| 1037149 | 2016-04-18 03:59:00 | 2016-04-17 22:59:00 | Lazard Ltd | LAZ US | Annual | [Y] | N | N | Y | Y | N | N |
| 1039618 | 2016-04-18 04:00:00 | 2016-04-17 23:00:00 | C. R. Bard, Inc. | BCR US | Annual | [Y] | N | N | Y | Y | N | N |

FIG. 4B

| | | |
|---|---|---|
| R | Rush Vote | Meetings for which the cutoff date is due in next 3 days |
| D 470 | Deviation | Proposals for which management recommendations <> ISS recommendations <> policy recommendations do not agree |
| P 472 | Proxy Contest | Proxy Contest Meeting |
| I 474 | Issuer | Indicates the issuer. |
| A 476 | Auto Recommend | Meetings for which all the recommendations are matching |
| 1 or 3 or etc. | Holder ranking 478 | When any issuer is held by multiple accounts, the system need to calculate the ranking of the funds based on "shares to Vote " for each account.<br>The indicator of 1,2,3... is used to show the ranking of the issuer based on which the owner is required to take action/vote decision. |
| TOP 25 480 | Top 25 Holdings | Listing top 25 holdings for Invesco |
| C 482 | Conflict Of Interest | Listing Conflict of interest issuers |
| 484 | Voting | Discussion initiated for the proposal/issuer |
| ✓ 486 | Voted | Indicates if user has done a voting activity on the Vote Card |
| V 488 | Vote Card Already Exists | Indicate the proposals for which vote card exists. |

Holding

CGI Group Inc.

User | Account

Drag a column header here to group by that column.

| Location Name | Fund Manager | PGH Account Code | Account Name | Shares To Vote Σ | Rank |
|---|---|---|---|---|---|
| [122] AIM Advi... | Brent Bates, A... | IGF-0920 | Invesco Intern... | 4,939,549 | 1 |
| [122] AIM Advi... | Brent Bates, A... | VIIG-KG12 | Invesco V.I. Int... | 985,797 | 2 |
| [122] AIM Advi... | APAM-FM | | Aim Aggregat... | 844,077 | 3 |
| [122] AIM Advi... | Brent Bates, A... | 750-080-01 | JNL/Invesco In... | 753,064 | 4 |
| [122] AIM Advi... | APAM-FM | | NVIT Multi-Ma... | 484,313 | 5 |
| [122] AIM Advi... | Brent Bates, A... | JHIGF-2Y53 | IVAXXXXX | 477,459 | 6 |
| [122] AIM Advi... | Brent Bates, A... | 200-202-01 | John Hancock... | 446,064 | 7 |
| [122] AIM Advi... | Brent Bates, A... | | Invesco Canad... | 393,136 | 8 |
| [122] AIM Advi... | Brent Bates, A... | IGFCT | Invesco Intern... | 392,091 | 9 |
| [122] AIM Advi... | Brent Bates, A... | | Invesco Intern... | 391,640 | 10 |
| [122] AIM Advi... | Brent Bates, A... | 300-303-01 | Aim Internatio... | 365,208 | 11 |
| [122] AIM Advi... | Brent Bates, A... | | Invesco Canad... | 359,297 | 12 |
| [122] AIM Advi... | Brent Bates, A... | 750-590-01 | AZL Invesco In... | 272,717 | 13 |

FIG. 5B

COMPUTER IMPLEMENTED METHOD AND SYSTEM FOR PROXY VOTING

RELATED APPLICATION AND PRIORITY CLAIM

The present disclosure claims priority from co-pending India Provisional Patent Application having the title "COMPUTER IMPLEMENTED METHOD AND SYSTEM FOR PROXY VOTING", assigned Application Number: 201641012230, Filed on: 7 Apr. 2016 and co-pending India non-Provisional Application having the title "COMPUTER IMPLEMENTED METHOD AND SYSTEM FOR PROXY VOTING", assigned Application Number: 201641012230, Filed on: 6 Apr. 2017, both the co-pending applications being incorporated in their entirety into the present application, to the extent not inconsistent with the disclosure herein.

TECHNICAL FIELD

The present disclosure relates to the field of proxy voting systems and methods employed thereof.

BACKGROUND

Proxy voting from an asset management firm perspective is defined as casting proxy votes for the securities in their portfolios on behalf of its fund's shareholders. The limitations associated with the conventional Proxy voting applications is lack of straight through processing (STP) for collecting comprehensive information, for example, all the business related data from various sources and then present it to the respective stakeholders i.e., fund managers and other similar users.

In the light of aforementioned discussion there exists a need for a system and method that would ameliorate or overcome above mentioned limitations.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Computer implemented method and system for proxy voting are disclosed. The method includes accessing a proxy admin system for casting a plurality of votes, clicking on a delegate button in the proxy admin system for selecting at least one fund manager; searching for a plurality of vote meetings of the fund manager on a vote card list screen; clicking on a quick vote for selecting a plurality of appropriate policies; a plurality of meetings and a plurality of comments; and clicking on a vote button for successful voting in the proxy admin system.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein:

FIG. 4B is a proxy vote due report in a fund manager system, according to exemplary embodiments of the present disclosure.

FIG. 4D is an information application representing flags information of a fund manager system, according to exemplary embodiments of the present disclosure.

FIG. 5A-FIG. 5B are exemplary user interfaces representing vote card screens of a fund manager system, according to exemplary embodiments of the present disclosure.

DETAILED DESCRIPTION OF EXAMPLE EMBODIMENTS

Figure 1:
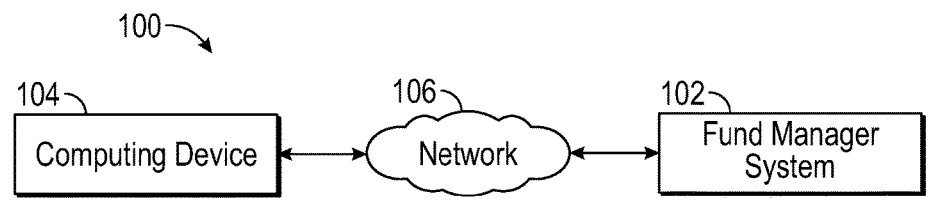
FIG. 1 is a diagram representing a proxy voting environment, according to exemplary embodiments of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

More illustrative information will now be set forth regarding various optional architectures and uses in which the foregoing method may or may not be implemented, as per the desires of the user. It should be strongly noted that the following information is set forth for illustrative purposes and should not be construed as limiting in any manner. Any of the following features may be optionally incorporated with or without the exclusion of other features described.

Referring to FIG. 1 is a diagram 100 representing a proxy voting environment, according to exemplary embodiments of the present disclosure. The proxy voting environment 100 includes a fund manager system 102 and a computing device 104 connected over a network 106. The network 106 includes, but not limited to, an ethernet, a local area network (LAN), or a wide area network (WAN), e.g., the internet, or a combination of networks. The computing device 104 may include a computer, a laptop, a mobile, a tablet, and the like, without limiting the scope of the disclosure. The users of the proxy voting system here may include, but not limited to, fund managers, officers, proxy admin team, or other similar authorized persons. The fund manager system 102 may be configured to be used as a mobile application and/or a desktop application through a dedicated and/or centralized web interface, without limiting the scope of the disclosure.

Figure 2:
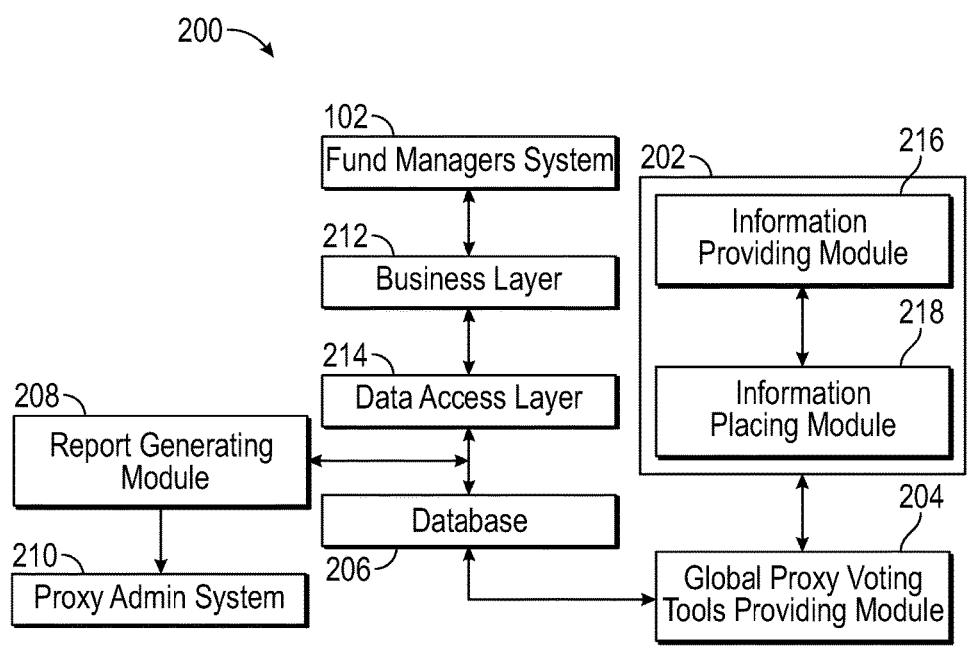
FIG. 2 is a diagram representing a proxy voting system, according to exemplary embodiments of the present disclosure.

Referring to FIG. 2 is a diagram 200 representing a proxy voting system, according to exemplary embodiments of the present disclosure. The proxy voting system 200 includes a fund manager system 102, a vendor data system 202, a global proxy voting tools providing module 204, a database 206, a report generating module 208, a proxy admin system 210, a business layer 212 and a data access layer 214.

According to non-limiting exemplary embodiments of the present disclosure, the vendor data system 202 further includes an information providing module 216 and an information placing module 218. The information providing module 216 may be configured to provide files to the users. The content of the files here may include meetings information, ballots information, business flags, business materials, research materials, without limiting the scope of the disclosure. The files may be stored in the form of XML (extensible markup language) files, PDF (portable document format) files, XFDF (XML version of the forms data format) files, and the like, without limiting the scope of the disclosure. The vendor here may include, but not limited to institutional shareholder services and the like. The information placing module 218 may be configured to place the files on specified locations for sending the data files to the global proxy voting tools providing module 204.

According to non-limiting exemplary embodiments of the present disclosure, conflicts of interest flag may be implemented to segregate the special meetings in the fund manager system 102 to the users and allow the users to vote. The global proxy voting tools providing module 204 may be configured to provide an auto vote process and/or a safety net process. The auto vote process and/or safety net process may be configured for automatically casting votes of the ballots associated with an account policy on the meetings. The account policy may be an international account to cast the votes on their respective ballots. The global proxy voting tools providing module 204 may also provide a mirror vote process. The mirror vote process may be configured for automatically casting votes of the ballots related to passive accounts based on the vote of the highest rank holder who is actively managing their accounts. The passive accounts here may be referred to funds which are not actively managed by a dedicated user. For example, a power shares business system has passive funds and has a very high volume of business. The power shares ballots of the business system may be voted using the mirror vote process.

According to non-limiting exemplary embodiments of the present disclosure, the users cast votes, and rejected votes information may be converted to files using the global proxy voting tools providing module 204. The information placing module 218 may be configured to place the files on specified locations for sending the data files to the vendor data system 202. The users may share the cast votes, rejected votes information to the vendor data system 202 using secure file transfer protocol transmission, for example. The vendor data system 202 may send the cast votes, rejected votes to the custodians.

According to non-limiting exemplary embodiments of the present disclosure, the fund manager system 102 may be configured to provide delegation of votes of users by the other authorized users on the fund manager system 102. If the users may not have a time to cast their votes then they may assign to the other authorized users. The authorized users may have access to the fund manager system 102 who in turn on the meetings. The authorized users may cast the votes based on the behalf of user's. The multiple users may be mapped to a single international account and each of the users may vote on their respective ballots.

According to non-limiting exemplary embodiments of the present disclosure, the business layer 212 and the data access layer 214 are configured to determine how data created, displayed, stored, and changed from the database 206 to the fund manager system 102. The data may be accessed from the vendor data system 202. The report generating module 208 may be configured to generate reports of activities of the fund manager system 102 and also from the proxy admin system 210.

According to non-limiting exemplary embodiments of the present disclosure, the report generating module 208 may also track the deficiencies on the fund manager system 102. The database 206 may be configured to store the data files, generated reports, business information files and the like without limiting the scope of the disclosure. The proxy admin system 210 may get the activity reports of the fund manager system 102. The fund manager system 102 may address the noise by filtering the list of meetings from the vendor data system 202 based on the in-built business logic and then automatically may do the assignment of meetings to the users who may address them before the cut-off date.

Figure 3:
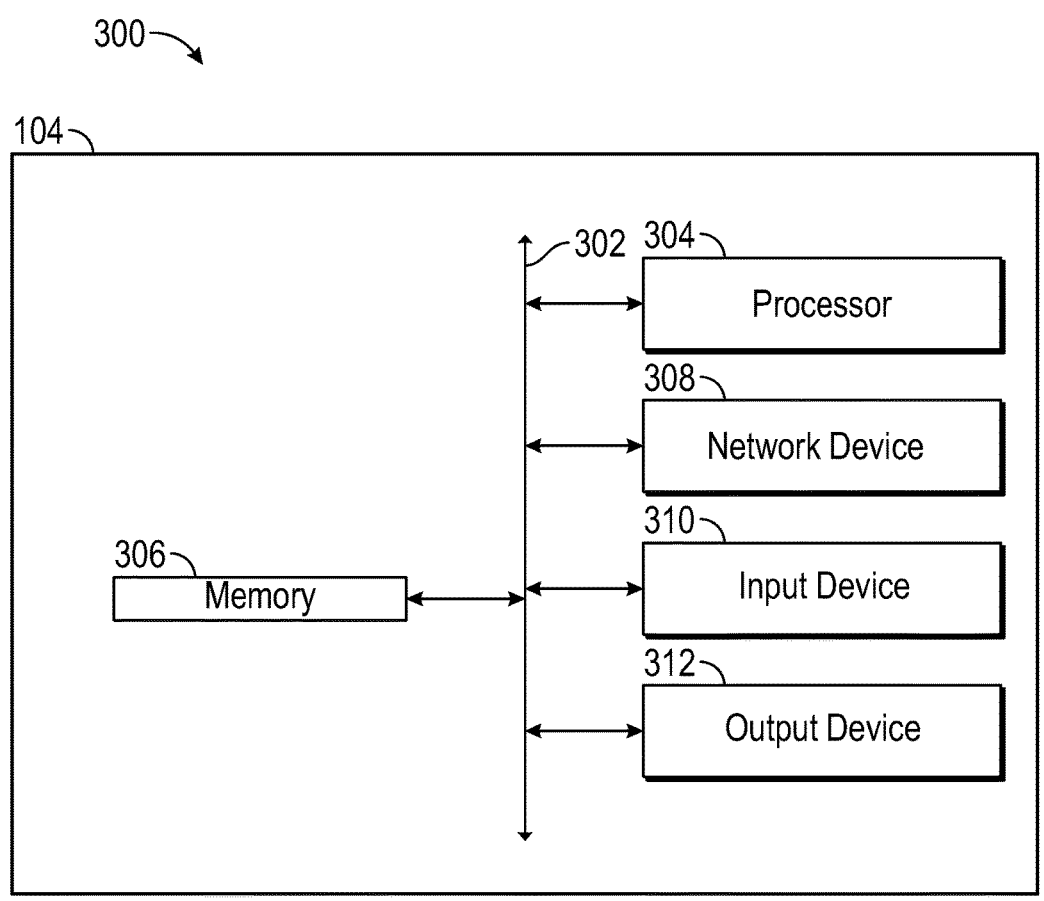
FIG. 3 is a block diagram representing a computing device, according to exemplary embodiments of the present disclosure.

Referring to FIG. 3 is a block diagram 300 representing a computing device, according to exemplary embodiments of the present disclosure. It should be noted, however, that embodiments are not limited to implementation on such computing devices 104, but may be implemented on any of a variety of different types of computing units within the scope of embodiments hereof. The computing device 104 is only one example and it is not intended to suggest any limitation as to the scope of use or functionality of the disclosure.

In some embodiments, the computing device 104 may include a bus 302, a processor 304, a memory 306, a network device 308, an input device 310, and an output device 312. The bus 302 may include a path that permits communication among the components of the computing device 104.

The memory 306 may be any type of computer memory known in the art or future-developed for electronically storing data and/or logic, including volatile and non-volatile memory. In this regard, memory 306 can include random access memory (RAM), read-only memory (ROM), flash memory, any magnetic computer storage unit, including hard disks, floppy discs, or magnetic tapes, and optical discs.

The processor 304 comprises processing hardware for interpreting or executing tasks or instructions stored in the memory 306. Note that the processor 304 may be a microprocessor, a digital processor, or other type of circuitry configured to run and/or execute instructions.

The network device 308 may be any type of network unit (e.g., a modem) known in the art or future-developed for communicating over a network device 308.

The input device 310 is any type of input unit known in the art or future-developed for receiving data. As an example, the input unit 310 may be a keyboard, a mouse, a touch screen, a serial port, a scanner, a camera, or a microphone.

The output device 312 may be any type of output unit known in the art or future-developed for displaying or outputting data. As an example, the output device 312 may be a liquid crystal display (LCD) or other type of video display unit, a speaker, or a printer.

Figure 4A:
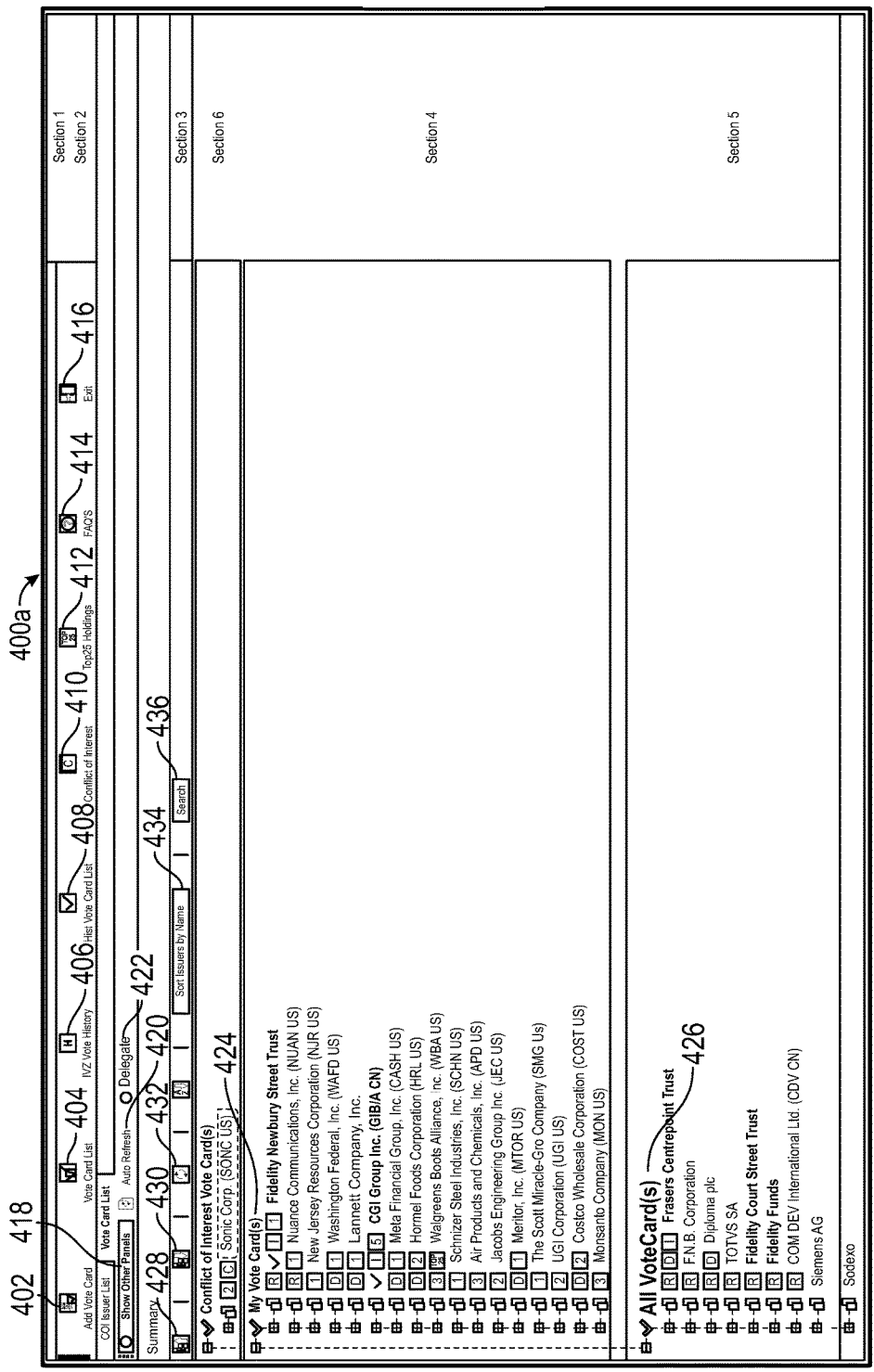
FIG. 4A is an exemplary user interface representing landing screen of a fund manager system, according to exemplary embodiments of the present disclosure.

Referring to FIG. 4A is an exemplary user interface 400a representing landing screen of a fund manager system, according to exemplary embodiments of the present disclosure. The users may access the fund manager system 102 by providing login identity credentials. The identity credentials here may include, but not limited to user login ID, password, website ID or other similar identities and the like. The fund manager system 102 includes various graphical user interface elements like, add vote card 402, voter card list 404, IVZ vote history 406, history vote card list 408, conflict of interest vote card(s) 410, top 25 holdings 412, FAQ's 414, exit 416, show other panels 418, auto refresh 420, delegate 422 and the like.

According to non-limiting exemplary embodiments of the present disclosure, the add vote card element 402 may be configured to create new vote cards. The voter card list element 404 may be configured to view and/or participate in a discussion. The IVZ vote history element 406 may be configured to list the vote history of the issuer. The history vote card list 408 element may be configured to view the history of vote cards and research material. The conflict of interest vote card(s) 410 may be configured to view the conflict of interest list of issuers. The top 25 holdings element 412 may be configured to view the top 25 holdings list. The FAQ's element 414 may be configured to view the links. The exit element 416 may be configured to exit the fund manager system 102.

According to non-limiting exemplary embodiments of the present disclosure, the vote card list element 404 includes my vote card(s) 424 and all vote card(s) section 426. The vote card list 404 further includes click for collapsing 428, click for expanding 430, click for refreshing 432, sort issuers by name 434, a search 436 and the like. The click for collapsing element 428 may be configured to collapse the proposals under my vote card 424 and the all vote card 426. The click for expanding element 430 may be configured to expand the proposals under my vote card 424 and the all vote card 426. The click for refreshing element 432 may be configured to refresh the vote card list. The sort issuers by name element 434 may be configured to sort the vote card list either by issuer name or vote due date. The search element 436 may be configured to search the meetings based on the issuer description or ticker.

According to non-limiting exemplary embodiments of the present disclosure, the "My Vote Card" section 424 may be configured to display the list of issuers belonging to the accounts assigned to the users. The "My Vote Card" section 424 may provide the list of meetings which belongs to the logged user. The lists of meetings may present in the user account. The all vote card section 426 may be configured to display the list of issuers for the vote cutoff date has not passed. The all vote card section 426 may be configured to share discussion and/or comments of one user with other users. The "My Vote Card" section 424 and the all vote card section 426 may display the vote card list 404 in summary view i.e., issuers are listed in a tree format with a node as issuer.

Referring to FIG. 4B is a proxy vote due report 400b in a fund manager system, according to exemplary embodiments of the present disclosure. The proxy vote due report 400b may be sent to the users through an email. The proxy vote due report 400b may be a pdf based report. The proxy vote due report 400b displays the list of all meetings to the respective authorized user. The proxy vote due report 400b includes text elements which are a meeting ID 438, a IVZ meeting cut-off date (Greenwich mean time) 440, a IVZ meeting cut-off date (central standard time) 442, a issuer name 444, a ticker 446, a meeting type 448, a D flag 450, a IS COI 452, a IS Top 25 454, a ISS rec 456, a GL rec 458, a merger 460, and an acquisition 462.

Figure 4C:
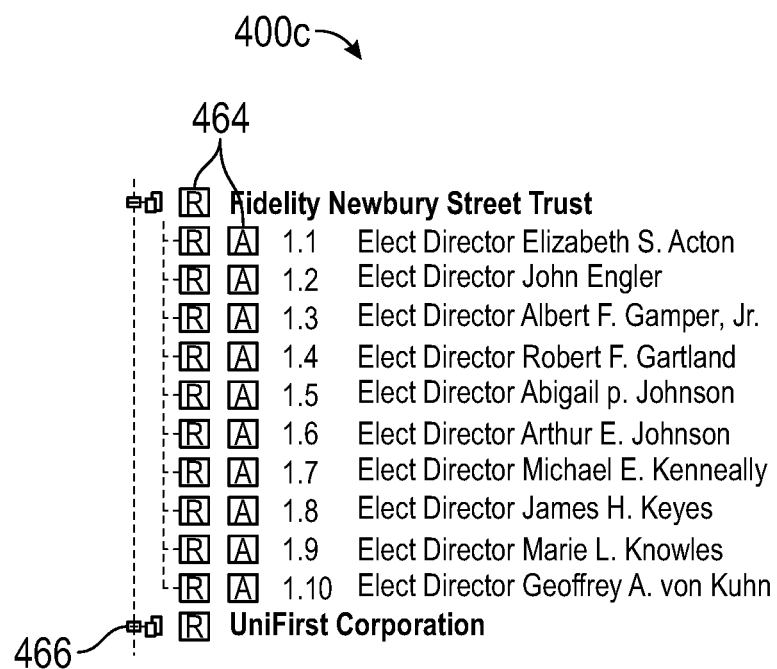
FIG. 4C is an exemplary user interface of a flag representation screen in a fund manager system, according to exemplary embodiments of the present disclosure.

Referring to FIG. 4C is an exemplary user interface 400c of flag representation screen in a fund manager system, according to exemplary embodiments of the present disclosure. The flags representation screens includes various flags 464. The flags on each proposal of the meeting may be seen on clicking the '+' sign 466.

Referring to FIG. 4D is an information application 400d representing flags information of a fund manager system, according to exemplary embodiments of the present disclosure. The flags 464 (in FIG. 4C) provide quick information to the users which may include rush vote 468, deviation 470, proxy contest 472, issuer 474, auto recommend 476, holder ranking 478, top 25 holdings 480, conflict of interest 482, voting 484, voted 486, vote card already exists 488 and the like.

According to non-limiting exemplary embodiments of the present disclosure, the rush vote 468 may be configured to provide the cutoff date is due for the meetings to the users. The deviation 470 may be configured to provide they do not agree proposals of management recommendations, ISS (institutional shareholder services) recommendations, policy recommendations and the like. The proxy context 472 may be configured to provide proxy contest meeting. The issuer 474 may be configured for indicating the issuers. The auto recommend 476 may be configured to provide recommendations matching to the meeting. The holder ranking 478 may be configured to calculate the ranks of the funds based on the shares to vote for each account of the user and the user may have multiple accounts. The top 25 holdings 480 may be configured for the listing of the top 25 holdings. The conflict of interest 482 may be configured to provide the listing conflict of interest issuers. The voting 484 may be configured to initiate the discussion for the issuer or proposal. The voted 486 may be configured to indicate the voting activity of the user on the vote card. The vote card already exists 488 may be configured to indicate the proposals for which vote card exists.

Figure 5A:

Referring to FIG. 5A-FIG. 5B are exemplary user interfaces 500a-500b representing vote card screens of a fund manager system, according to exemplary embodiments of the present disclosure. The vote card screens 500a-500b provides business information which may be required to the users to take a voting decision. The vote card screen 500a-

500b depicts holdings screen 502, issuer details 504, proposal details 506, recommendation details 508, comments 510, vote 512, reset rec 514, edit 516, refresh 518, save 520 and like.

According to non-limiting exemplary embodiments of the present disclosure, the holding screen 502 may provide the ranking globally across the fund managers. The holdings screen 502 is further divided into two parts which are ranking of the fund managers with quantity of shares 522 and the ranking of fund managers at an account level along with the quantity of shares 524 (in FIG. 5B). The fund managers may manage the accounts in the ranking of fund managers at an account level along with the quantity of shares.

According to non-limiting exemplary embodiments of the present disclosure, the issuer details 504 include issuer attributes. The issuer attributes here may include, but not limited to name, meeting data, due date, flags and the like. The issuer details 504 further include related materials 526. The related materials 526 may be received from various sources like ISS, meeting material, and the like. The proposal details 506 may be configured to provide the details of proposal. The recommendation details 508 may be configured to provide recommendations from management, institutional shareholder services, glass Lewis and the like. The recommendation details 508 further includes vote selection list 528, reset selection element 530. The vote selection list 528 may include voting instruction applicable for the proposal, some of the examples are for 532, withhold 534, do not vote 536 and the like. The reset selection element 530 may be configured to clear the selected voting recommendation. The comments section 510 may be configured to provide the comments from the users. The comments section 510 may be configured to display the discussions, previous comments and the like.

According to non-limiting exemplary embodiments of the present disclosure, the vote 512 may be used to cast the votes. The reset rec 514 may be used to remove the recommendation by the current user, although a historical entry is present. The edit 516 may be used to perform edit operations on the vote card screen. The refresh 518 may be used to refresh the page. The save 520 may be configured to save the recommendations by the user.

Figure 6:
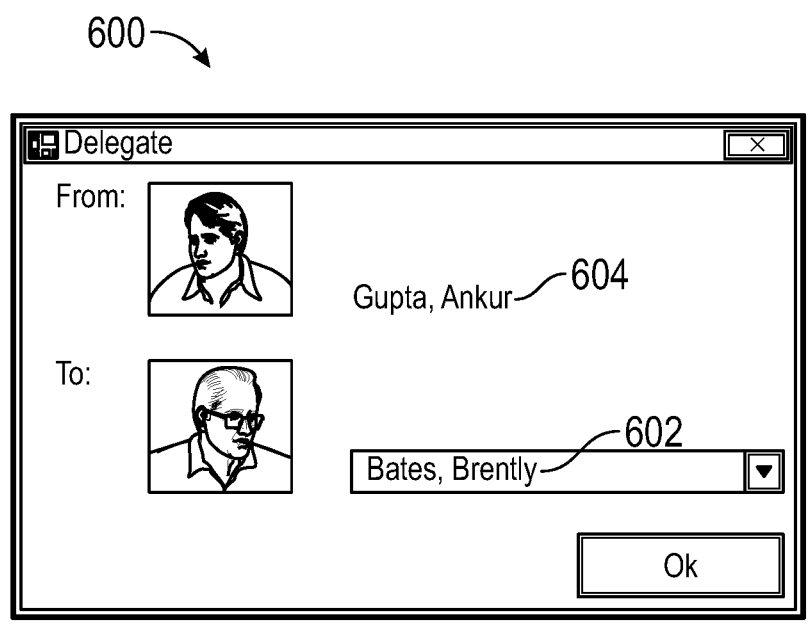
FIG. 6 is an exemplary user interface representing a delegate screen of a fund manager system, according to exemplary embodiments of the present disclosure.

Referring to FIG. 6 is an exemplary user interface 600 representing a delegate screen of a fund manager system, according to exemplary embodiments of the present disclosure. The delegation screen includes an authorized user 604 and a fund manager 602. The authorized user 604 who is delegating himself to vote on behalf of the fund manager 602. For example, if the fund manager 602 may not have a time to cast their votes then they may assign to the authorized user 604.

Figure 7:
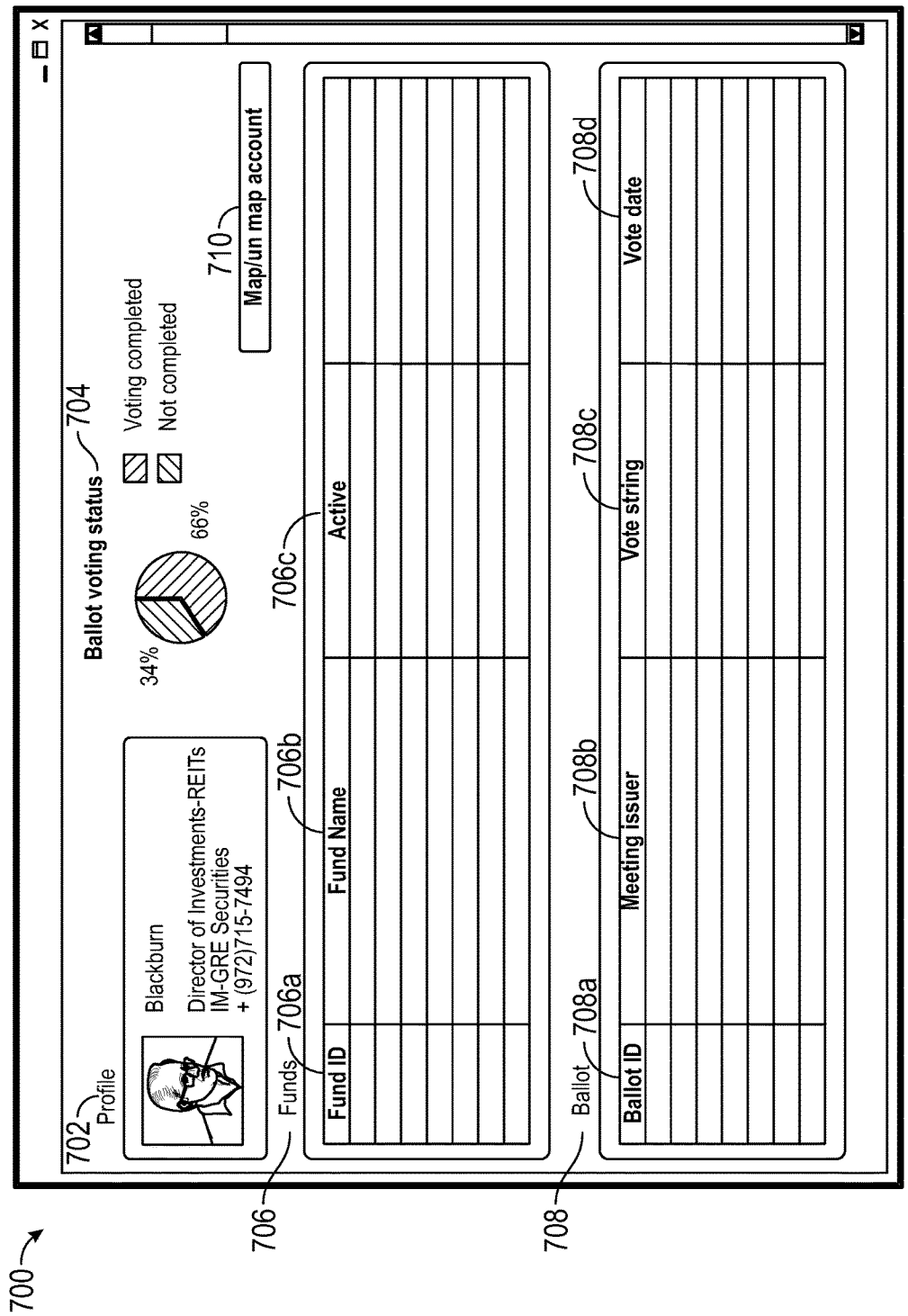
FIG. 7 is an exemplary user interface representing a fund manager profile in a fund manager system, according to exemplary embodiments of the present disclosure.

Referring to FIG. 7 is an exemplary user interface 700 representing a fund manager profile in a fund manager system, according to exemplary embodiments of the present disclosure. The fund manager profile screen 700 is configured to show mapping funds, current voting status, and list of active ballots across funds and the like without limiting the scope of the present disclosure. The fund manager profile screen includes, but not limited to, a profile 702, a pie chart ballot voting status 704, funds details 706 ballots details 708 and a map/un map account 710.

According to non-limiting exemplary embodiments of the present disclosure, the profile 702 which may include fund manager address details. The ballot voting status 704 may be represented in a pie chart representation or a circle chart representation, a donut chart representation and the like without limiting the scope of the present disclosure. The funds details 706 further include funds identities 706a, funds names 706b, and active status 706c. The ballot details 708 further include ballots identities 708a, meetings issuers 708b, vote's strings 708c, vote's dates 708d and the like without limiting the scope of the present disclosure. The map/un map account 710 may be configured to show the mapping/un mapping accounts.

Figure 8:
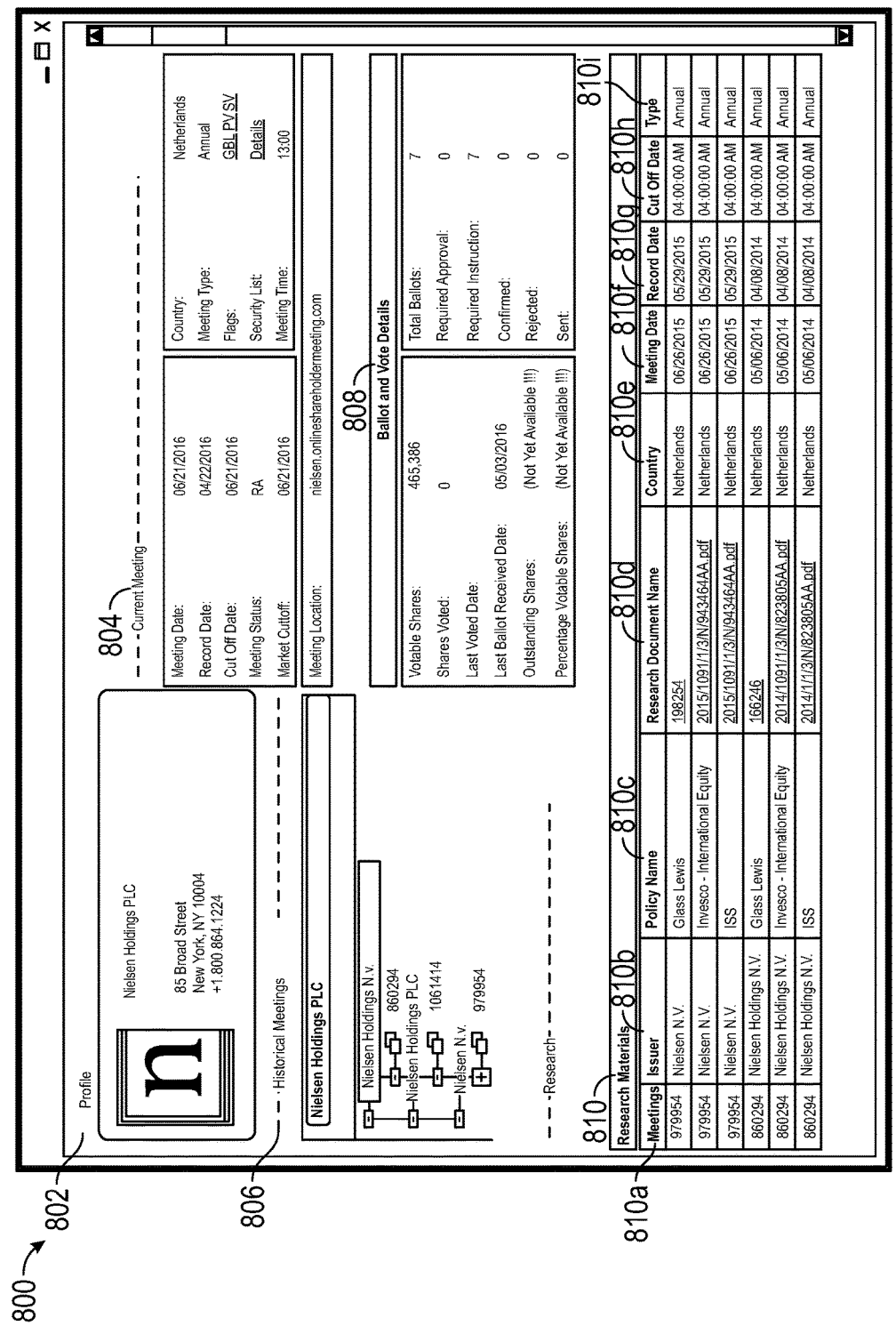
FIG. 8 is an exemplary user interface representing issuer details to fund managers in a fund manager system, according to exemplary embodiments of the present disclosure.

Referring to FIG. 8 is an exemplary user interface 800 representing issuer details to fund managers in a fund manager system, according to exemplary embodiments of the present disclosure. The issuer details screen 800 may be configured to provide meetings for the issuer in past and present. The issuer details screen 800 provides, but not limited to, statistics about number of shares, outstanding shares and research materials. The issuer details screen 800 includes a user profile 802, current meetings 804, historical meetings 806, ballots and vote details 808, research materials 810 and the like without limiting the scope of the present disclosure.

According to non-limiting exemplary embodiments of the present disclosure, the user profile 802 may include user personal address details. The current meetings 804 may include meeting date, record date, cutoff date, meeting status, market cutoff, and country name, meeting type, flags, security lists, meeting time and the like without limiting the scope of the present disclosure. The historical meetings 806 includes, but not limited to, user meetings with identities. The ballot and vote details 808 include, votable shares, shares voted, last voted date, last ballot received date, outstanding shares, percentage votable shares, total ballots, required approval, required instruction, confirmed, rejected, sent and the like without limiting the scope of the present disclosure. The research materials 810 includes, but not limited to, meeting identities 810a, issuers 810b, policy names 810c, research document names 810d, country names 810e, meeting dates 810f, research dates 810g, cutoff dates 810h, and types 810i. The voting decisions may be easier for the current fund manager by viewing other fund managers voting decisions.

Figure 9:
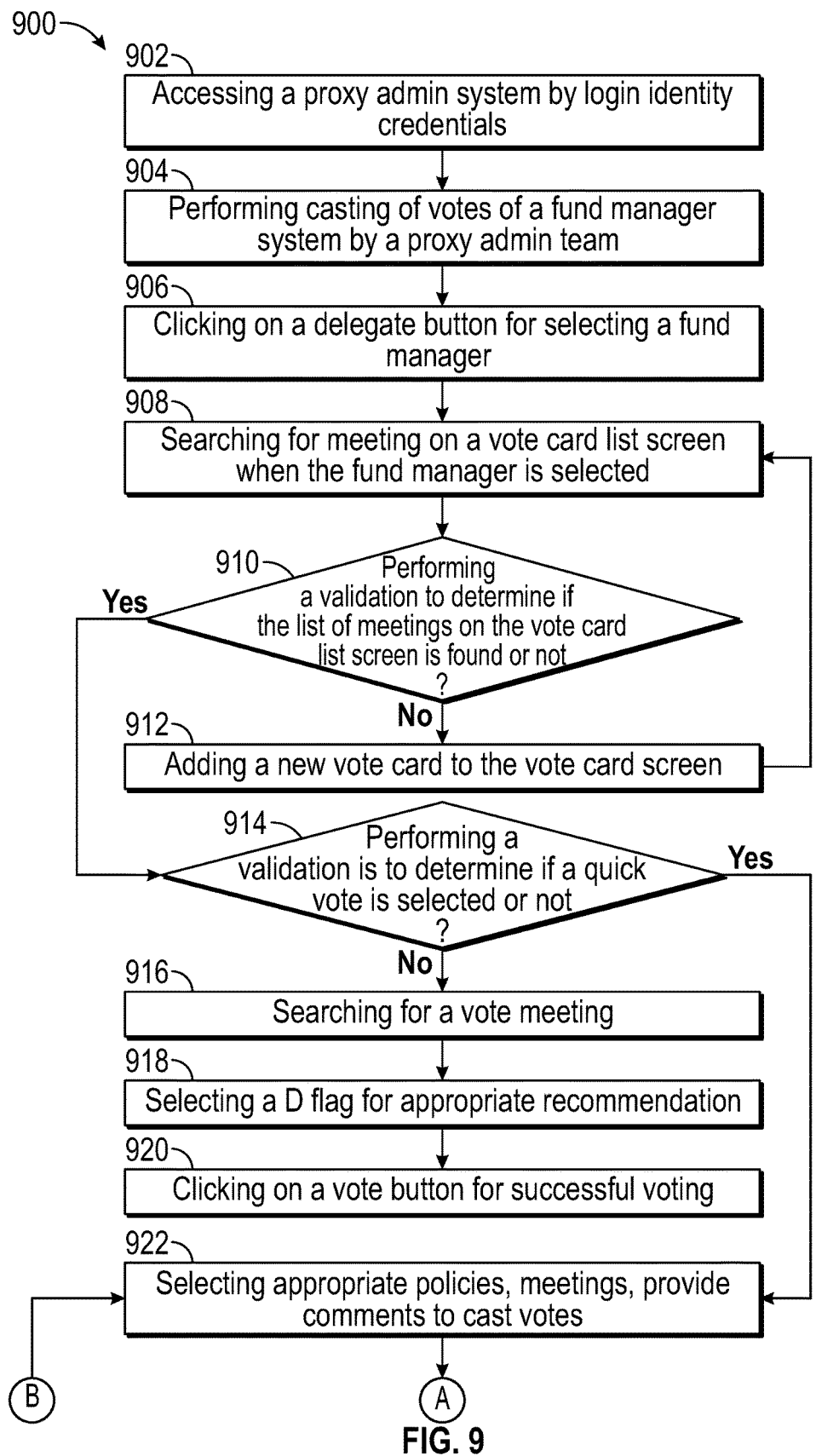
FIG. 9 is a flow diagram depicting a computer implemented method of proxy voting through a delegate vote by a proxy admin system, according to exemplary embodiments of the present disclosure.
Figure 9:
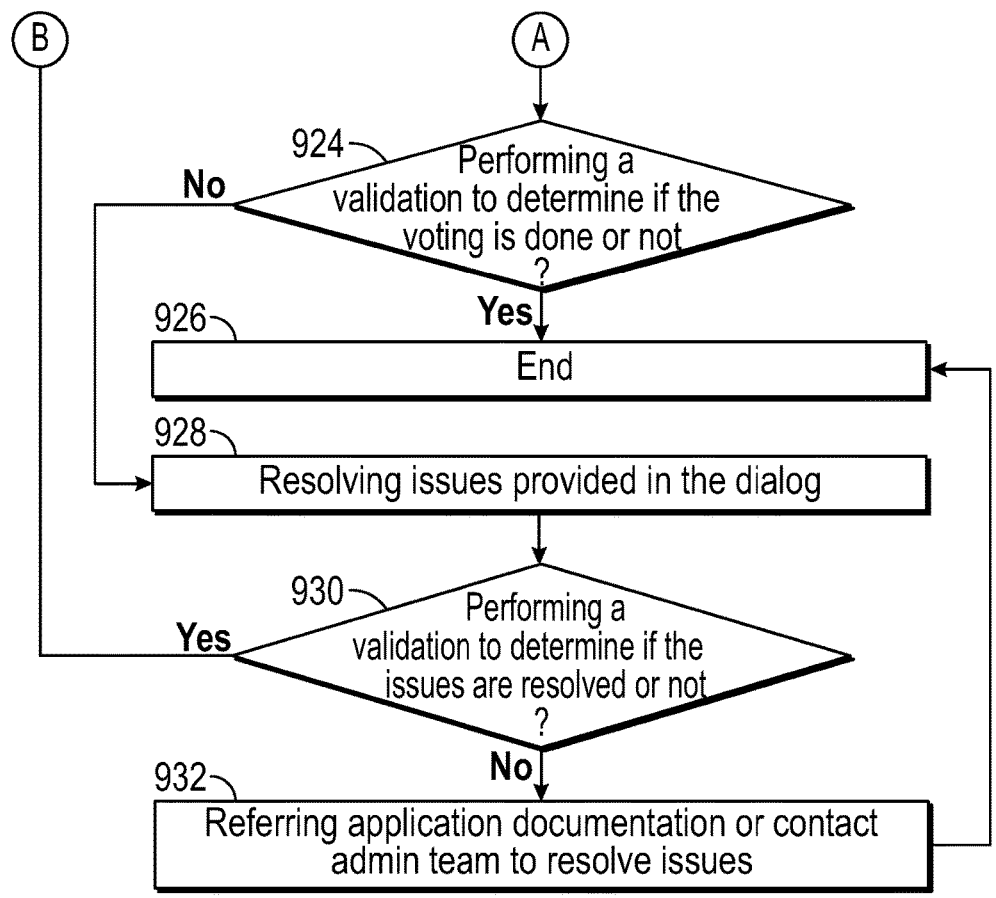

Referring to FIG. 9 is a flow diagram 900 depicting a computer implemented method of proxy voting through a delegate vote by a proxy admin system, according to exemplary embodiments of the present disclosure. As an option, the method 800 may be carried out in the context of the details of FIG. 1, FIG. 2, FIG. 3, FIG. 4, FIG. 5, FIG. 6, FIG. 7 and FIG. 8. However, the method 900 may be carried out in any desired environment. Further, the aforementioned definitions may equally apply to the description below.

The method starts at step 902, wherein users access the proxy admin system by login identity credentials. The identity credentials here may include, but not limited to, user login identity, password, website identity or other similar identities and the like. The proxy admin team may perform the casting of votes, at step 904. Click on a delegate button for selecting a fund manager, at step 906. Search for meeting on a vote card list screen when the fund manager is selected, at step 908. At step 910, a validation is performed to determine if the list of meetings on the vote card list screen is found or not. At step 910, if the list of meetings is not found on the vote card list screen then the method continues to next step 912 and a new vote card may be added to the vote card screen and the method goes back to step 908. At step 910, if the list of meetings is found on the vote card list screen then the method continues to next step 914 wherein a validation is performed to determine if a quick vote is selected or not. At step 914, if the quick vote is not selected then the method continues to next step 916 to search for vote meetings. Select a D flag for appropriate recommendation, at step 918. Click on a vote button is performed for successful voting, at step 920. At step 914, if the quick vote is selected then the method continues to next step 922 to select appropriate policies, meetings, provide comments and the like, to cast votes. At step 924, a validation is performed to determine if the voting activity is performed or not. At step 924, if the voting activity is performed then the method goes back to step 926. At step 924, if the voting is not performed then the method continues to next step 928 to resolve issues provided in the dialog. At step 930, a validation is performed to determine if the issues are resolved or not. At step 930, if the issues are resolved then the method continues to step 922. At step 930, if the issues are not resolved then the method continues to next step 932 to refer application documentation or contact admin team to resolve issues and the method goes back to step 926.

Figure 10:
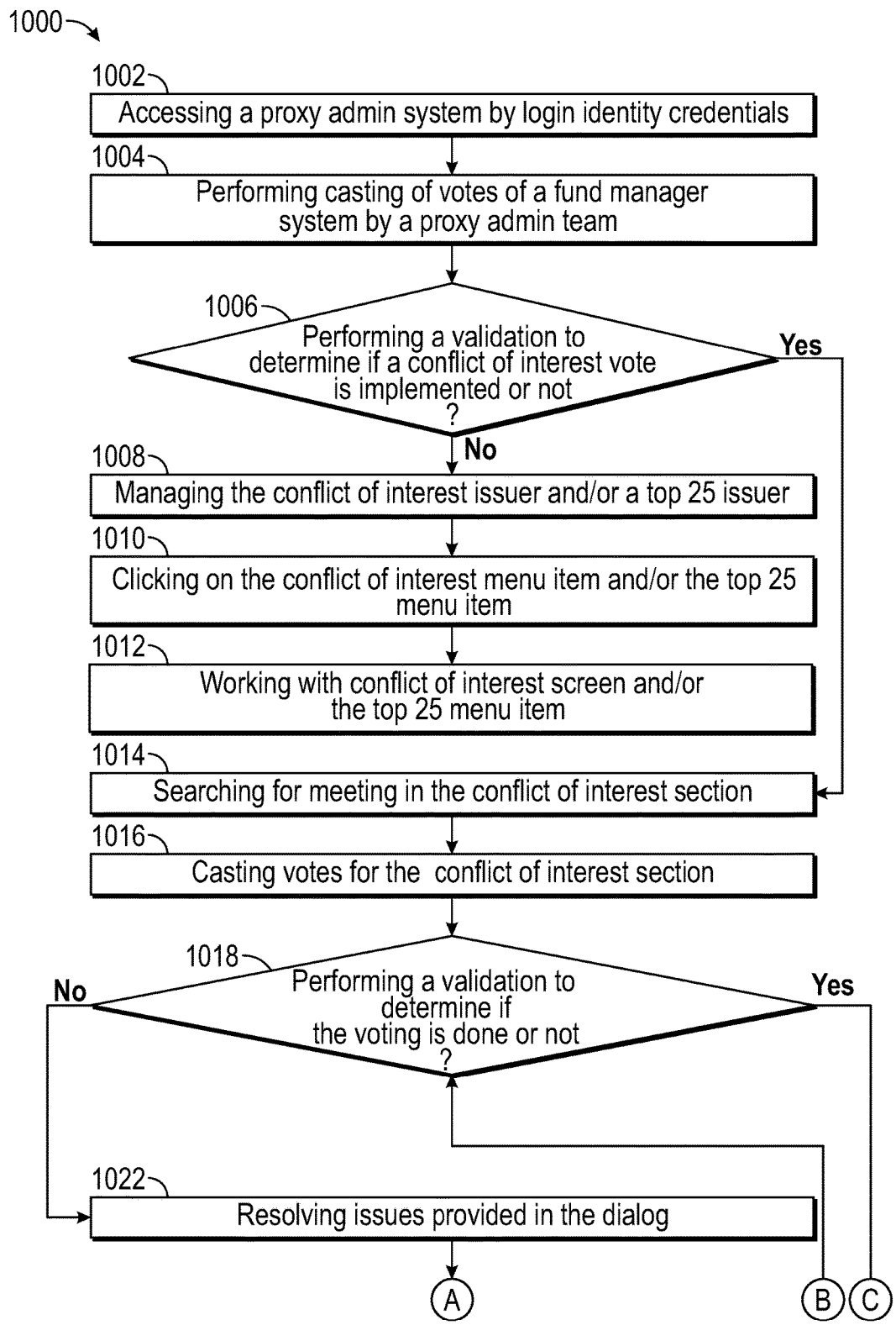
FIG. 10 is a flow diagram depicting a computer implemented method of proxy voting through a conflict of interest vote by a proxy admin system, according to exemplary embodiments of the present disclosure.
Figure 10:
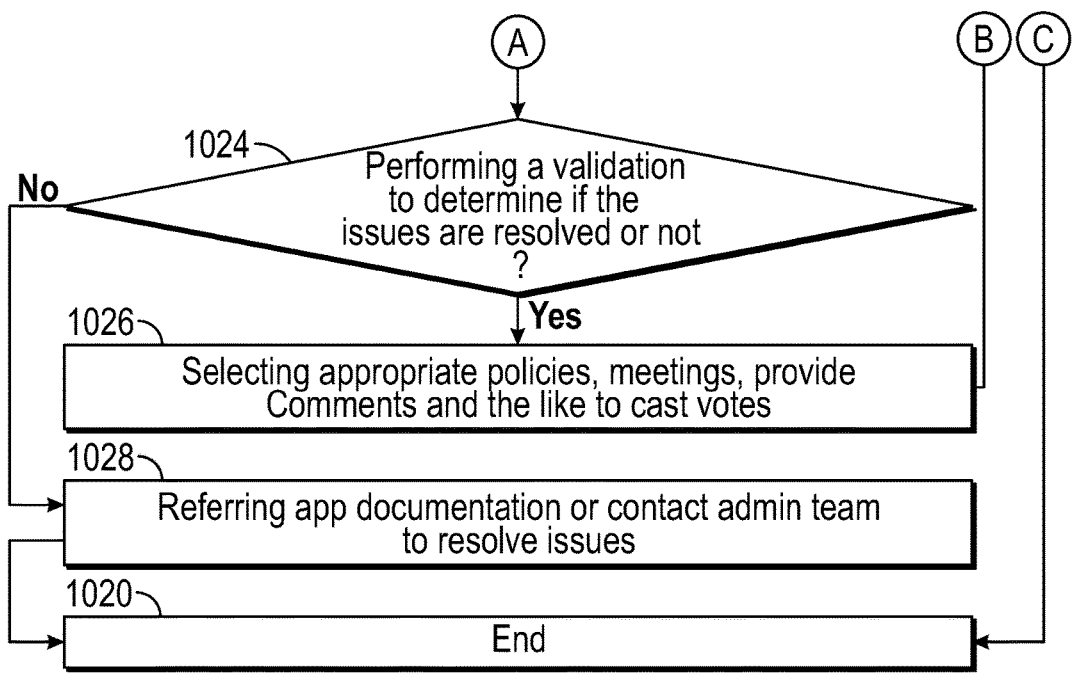

Referring to FIG. 10 is a flow diagram 1000 depicting a computer implemented method of proxy voting through a conflict of interest vote by a proxy admin system, according to exemplary embodiments of the present disclosure. As an option, the method 1000 may be carried out in the context of the details of FIG. 1, FIG. 2, FIG. 3, FIG. 4, FIG. 5, FIG. 6, FIG. 7, FIG. 8, and FIG. 9. However, the method 1000 may be carried out in any desired environment. Further, the aforementioned definitions may equally apply to the description below.

The method starts at step 1002, users allowed to success the proxy admin system by login identity credentials. The proxy admin team may perform the casting of votes of the fund manager system, at step 1004. At step 1006, validation is performed to determine if a conflict of interest vote is implemented or not. At step 1006, if the conflict of interest vote is not implemented then the method continues to next step 1008 to manage the conflict of interest issuer and/or a top 25 issuer. The users may click on the conflict of interest menu item and/or a top 25 menu item, at step 1010 and work with the conflict of interest screen and/or the top 25 menu item, at step 1012. At step 1006, if the conflict of interest vote is implemented then the method continues to next step 1014 to search for meeting in the conflict of interest section. Casting of votes for the conflict of interest section is performed, at step 1016. At step 1018, validation is performed to determine if the voting is done or not. At step 1018, if the voting is done then the method goes back to step 1020 to end. At step 1018, if the voting is not done then the method continues to next step 1022 to resolve issues provided in the dialog. At step 1024, a validation is performed to determine if the issues are resolved or not. At step 1024, if the issues are resolved then the method continues to next step 1026 to select appropriate policies, meetings, provide comments and the like to cast votes and the method goes back to step 1018. At step 1024, if the issues are not resolved then the method continues to next step 1028 to refer application documentation or contact admin team to resolve issues and the method goes at the step 1020.

Figure 11:
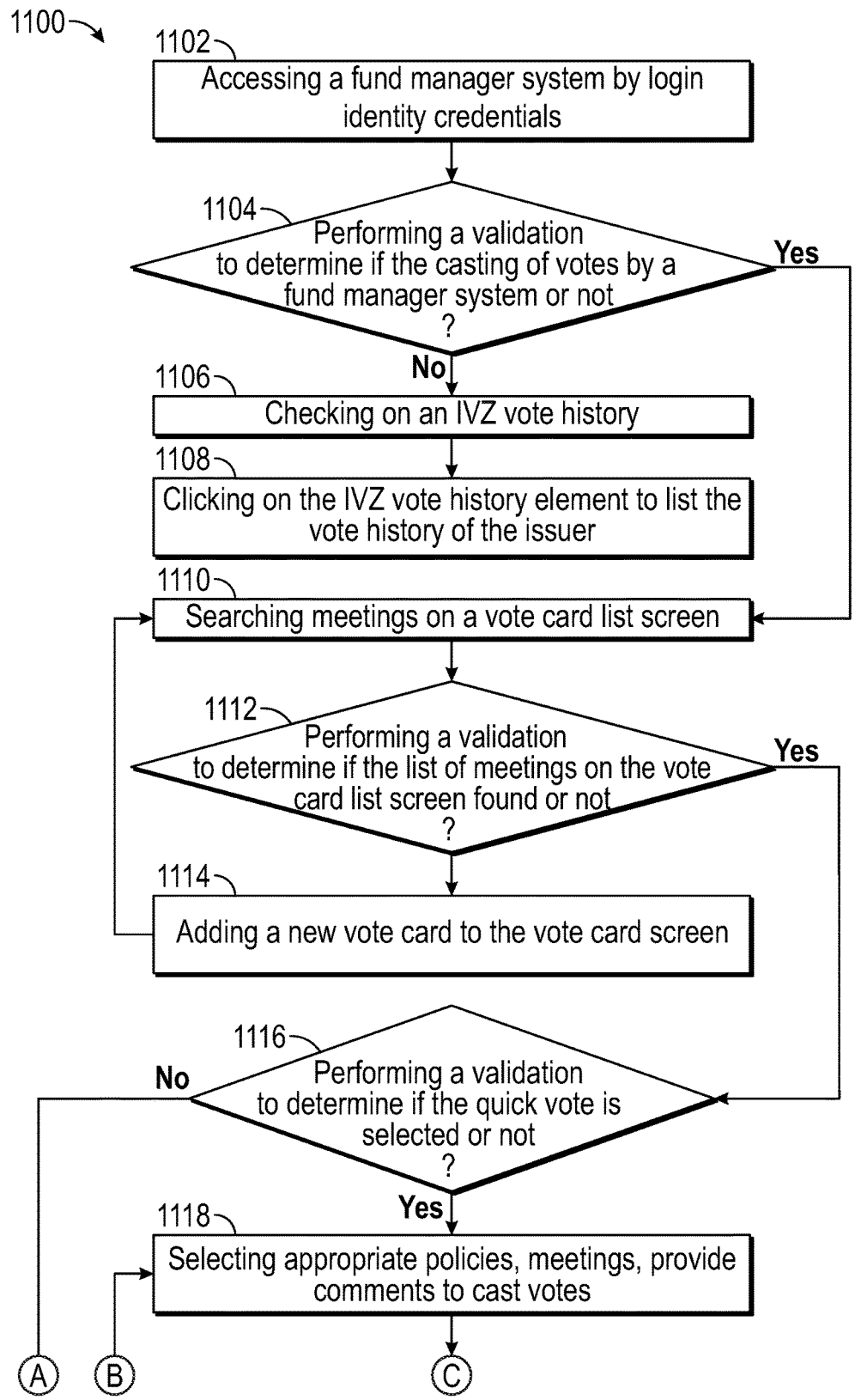
FIG. 11 is a flow diagram depicting a computer implemented method of proxy voting by a fund manager system, according to exemplary embodiments of the present disclosure.
Figure 11:
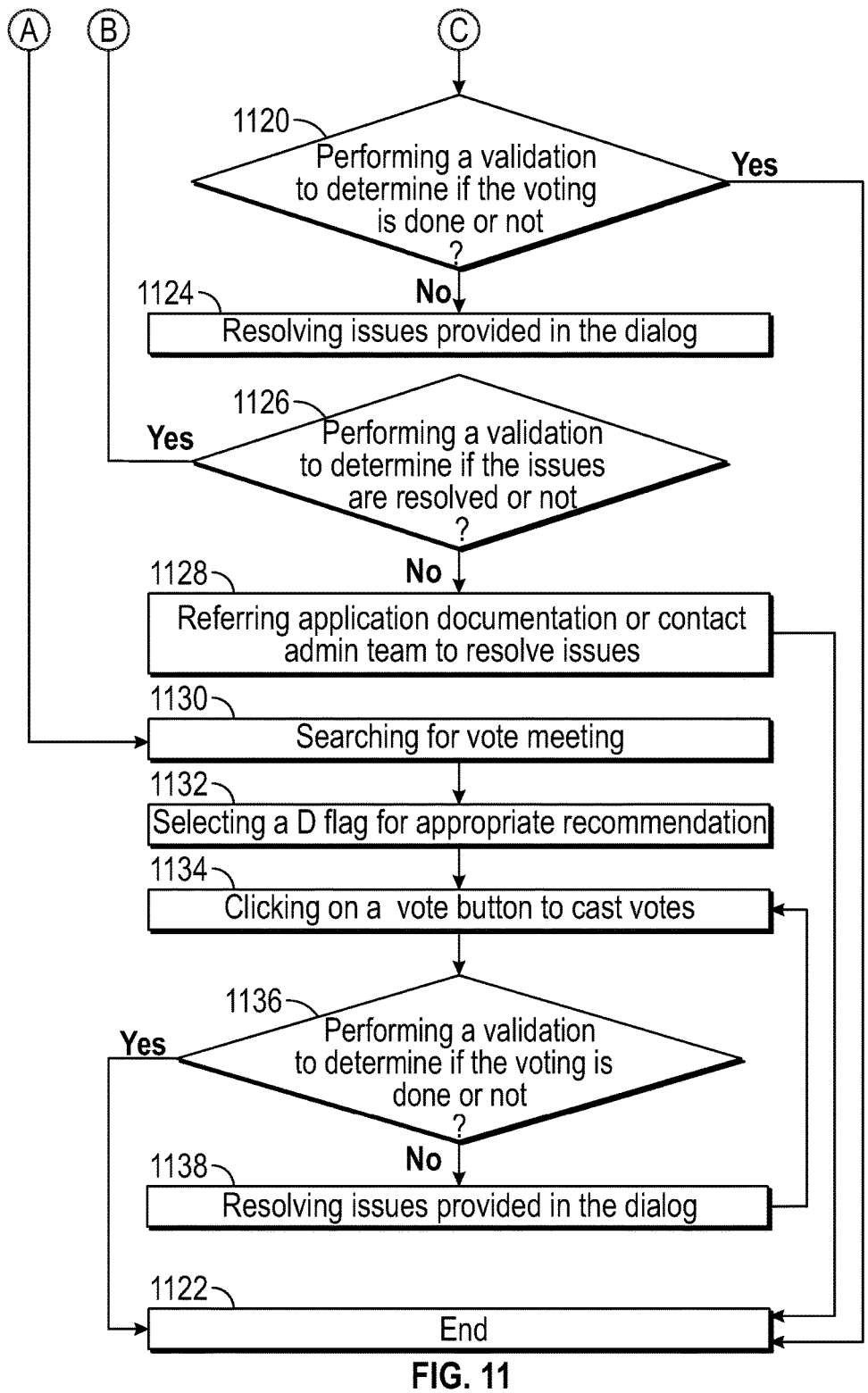

Referring to FIG. 11 is a flow diagram 1100 depicting a computer implemented method of proxy voting by a fund manager system, according to exemplary embodiments of the present disclosure. As an option, the method 1100 may be carried out in the context of the details of FIG. 1, FIG. 2, FIG. 3, FIG. 4, FIG. 5, FIG. 6, FIG. 7, FIG. 8, FIG. 9 and FIG. 10. However, the method 1100 may be carried out in any desired environment. Further, the aforementioned definitions may equally apply to the description below.

The method starts at step 1102, wherein users access a fund manager system by providing login identity credentials. At step 1104, a validation is performed to determine if the casting of votes is performed by a fund manager system or not. At step 1104, if the fund manager system is not interested to cast the votes then the method continues to next step 1106 to check on an IVZ vote history. The IVZ vote history element may be clicked to list the vote history of the issuer, at step 1108. At step 1104, if the fund manager system is interested to cast the votes then the method continues to next step 1110 to search meetings on a vote card list screen. At step 1112 a validation is performed to determine if the list of meetings on the vote card list screen found or not. At step 1112, if the list of meetings on the vote card list screen is not found then the method continues to next step 1114 wherein new vote cards may be added to the vote card screen and the method continues to step 1110. At step 1112, if the list of meetings on the vote card list screen is found then the method continues to next step 1116 wherein a validation is performed to determine if the quick vote is selected or not. At step 1116, if the quick vote is selected then the method continues to next step 1118 to select appropriate policies, meetings, provide comments, and the like, to cast the votes. At step 1120, a validation is performed to determine if the voting is done or not. At step 1120, if the voting is done then the method proceeds to step 1122. At step 1120, if the voting is not done then the method continues to next step 1124 to resolve issues provided in the dialog. At step 1126, a validation is performed to determine if the issues are resolved or not. At step 1126, if the issues are not resolved then the method continues to next step 1128 to refer application documentation or contact admin team to resolve the issues and the method continues to step 1122. At step 1126, if the issues are resolved then the method continues to the next step 1118. At step 1116, if the quick vote is not selected then the method continues to next step 1130 to search for vote meeting. D flag is selected for appropriate recommendation, at step 1132. The user clicks on a vote button to cast votes at step 1134. At step 1136, a validation is performed to determine if the voting is done or not. At step 1136, if the voting is performed then the method continues to the step 1122. At step 1136, if the voting activity is not performed then the method continues to next step 1138 to resolve issues provided in the dialog and the method continues to step 1134.

Figure 12:
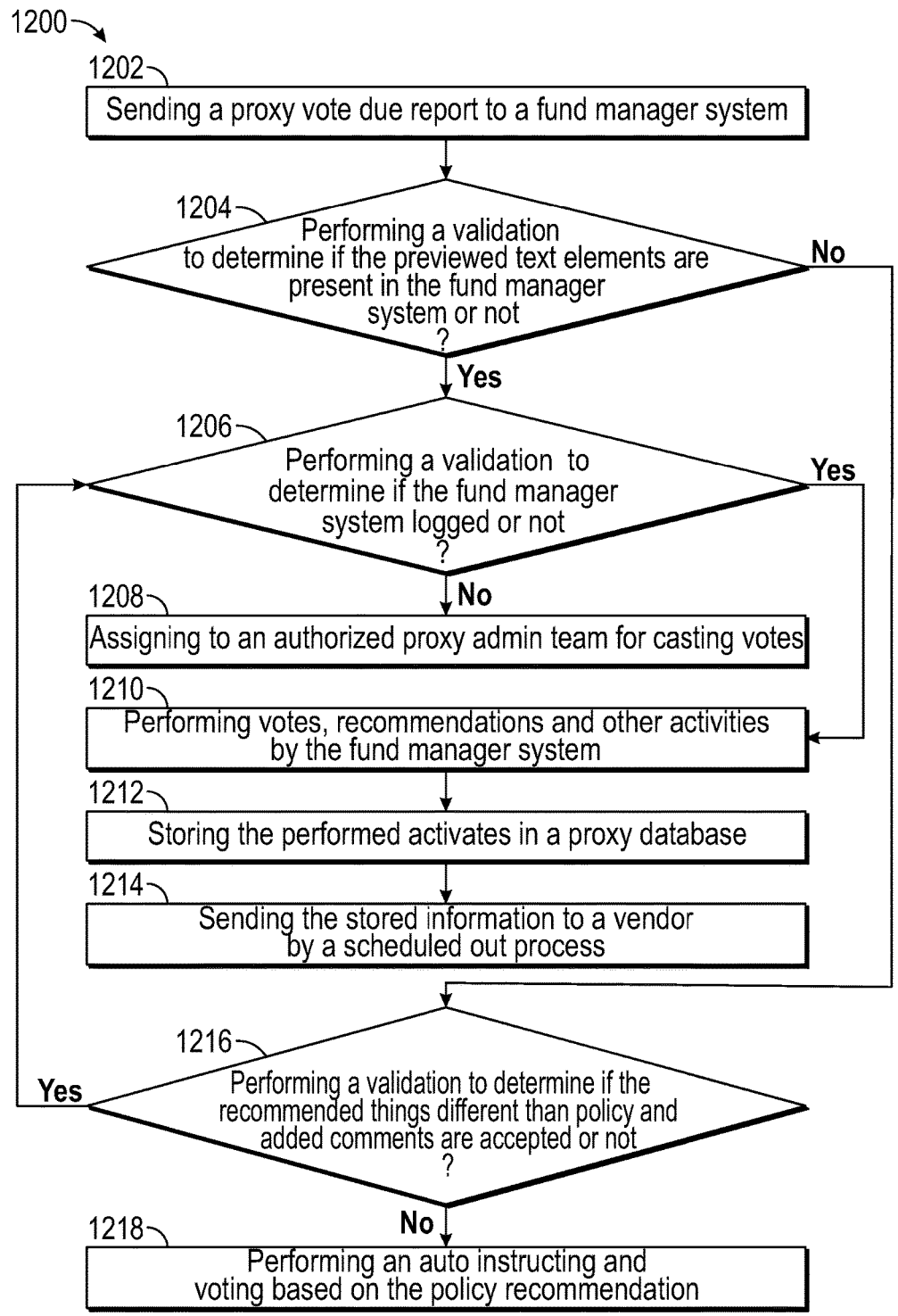
FIG. 12 is a flow diagram depicting a method of activities done in a fund manager system, according to exemplary embodiments of the present disclosure.

Referring to FIG. 12 is a flow diagram 1200 depicting a method of activities done in a fund manager system, according to exemplary embodiments of the present disclosure. As an option, the method 1200 may be carried out in the context of the details of FIG. 1, FIG. 2, FIG. 3, FIG. 4, FIG. 5, FIG. 6, FIG. 7, FIG. 8, FIG. 9, FIG. 10 and FIG. 11. However, the method 1200 may be carried out in any desired environment. Further, the aforementioned definitions may equally apply to the description below.

The method starts at step 1202, by sending a proxy vote due report to a fund manager system. The proxy vote due report includes text elements which include a meeting ID, a IVZ meeting cut-off date (Greenwich mean time), a IVZ meeting cut-off date (central standard time), an issuer name, a ticker, a meeting type, a D flag, a IS COI, a IS Top 25, a ISS rec, a GL rec, a merger, an acquisition and the like without limiting the scope of the present disclosure. At step 1204, a validation is performed to determine if the previewed text elements are present in the fund manager system or not. At step 1204, if the previewed text elements are present in the fund manager system then the method continues to next step 1206 wherein a validation is performed to determine if the fund manager system is accessed or not. At step 1206, if the fund manager is not accessed then the method continues to next step 1208 wherein votes casting may be assigned to an authorized proxy admin team. At step 1206, if the fund manager is accessed then the method continues to next step 1210 votes, recommendations and other activities may be performed by the fund manager system. The performed activities may be stored in a proxy database, at step 1212. The stored information may be sent to a vendor by a scheduled out process, at step 1214. At step 1204, if the previewed text elements are not present in the fund manager system then the method continues to next step 1216 wherein a validation is performed to determine if the recommended things are different than policy and added comments are accepted or not. At step 1216, if the recommended things and added comments are accepted then the method continues to step 1206. At step 1216, if the recommended things and added comments are not accepted then the method continues to next step 1218 to perform an auto instructing and a voting based on the policy recommendation.

More illustrative information will now be set forth regarding various optional architectures and uses in which the foregoing method may or may not be implemented, as per the desires of the user. It should be strongly noted that the following information is set forth for illustrative purposes and should not be construed as limiting in any manner. Any of the following features may be optionally incorporated with or without the exclusion of other features described.

Figure 13:
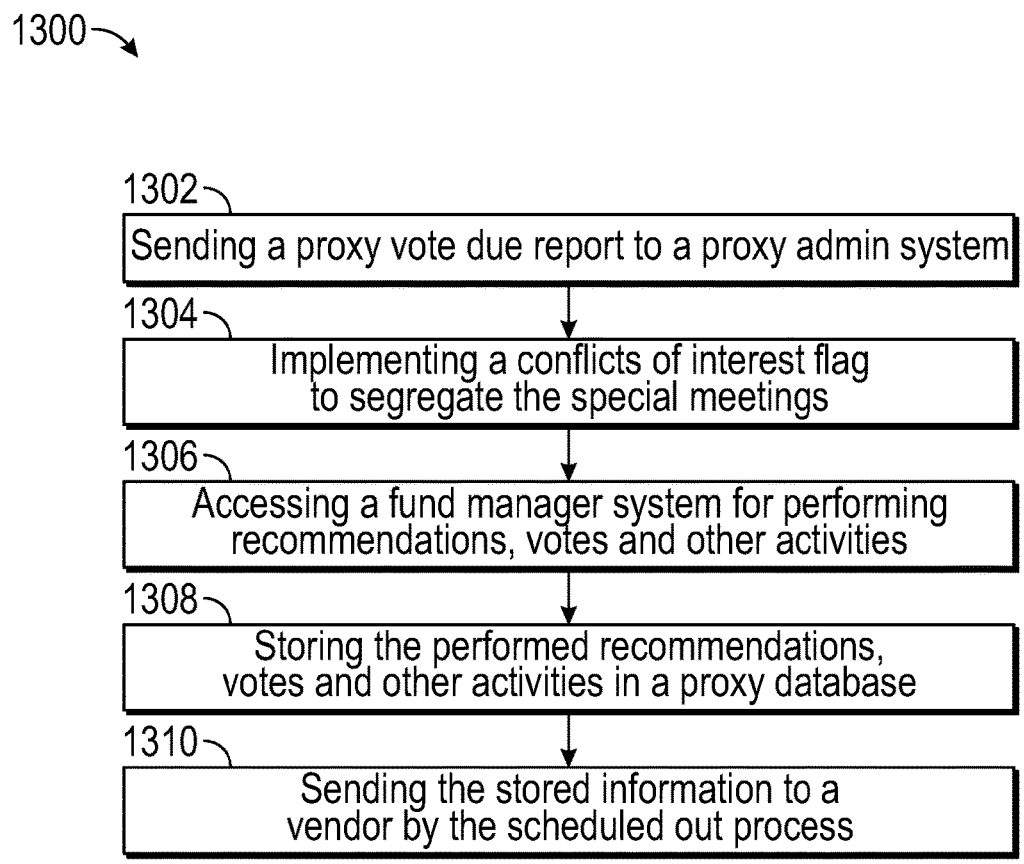
FIG. 13 is a flow diagram depicting a method of activities done in a proxy admin system, according to exemplary embodiments of the present disclosure.

Referring to FIG. 13 is a flow diagram 1300 depicting a method of activities performed in a proxy admin system, according to exemplary embodiments of the present disclosure. As an option, the method 1300 may be carried out in the context of the details of FIG. 1, FIG. 2, FIG. 3, FIG. 4, FIG. 5, FIG. 6, FIG. 7, FIG. 8, FIG. 9, FIG. 10, FIG. 11, and FIG. 12. However, the method 1300 may be carried out in any desired environment. Further, the aforementioned definitions may equally apply to the description below.

The method starts at step 1302, by sending a proxy vote due report to a proxy admin system. The proxy vote due report includes text elements which include a meeting ID, a IVZ meeting cut-off date (Greenwich mean time), a IVZ meeting cut-off date (central standard time), an issuer name, a ticker, a meeting type, a D flag, a IS COI, a IS Top 25, a ISS rec, a GL rec, a merger, an acquisition, and the like without limiting the scope of the present disclosure. The conflicts of interest flag may be implemented to segregate the special meetings, at step 1304. Recommendations, voting and other activities may be performed by accessing the fund manager system, at step 1306. The performed recommendations, voting and other activities may be stored in a proxy database, at step 1308. The stored information may be sent to a vendor by a scheduled out process, at step 1310.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

The invention claimed is:

1. A computer implemented method for proxy voting, comprising:
   accessing a proxy admin system for casting a plurality of votes;
   clicking on a delegate button in the proxy admin system for selecting at least one fund manager;
   searching for a plurality of vote meetings of the fund manager on a vote card list screen;
   clicking on a quick vote for selecting a plurality of appropriate policies; a plurality of meetings and a plurality of comments; and
   clicking on a vote button for successful voting in the proxy admin system.

2. The method of claim 1, further comprising selecting at least one flag for providing a plurality of recommendations.

3. The method of claim 1, further comprising adding at least one new vote card to the vote card screen for searching the plurality of vote meetings of the fund manager.

4. The method of claim 1, further comprising a step of performing voting through the conflict of interest section.

5. The method of claim 1, further comprising managing the conflict of interest issuer and a top issuer.

6. The method of claim 1, further comprising clicking on a conflict interest menu item and a top menu item for working with the conflict of interest issuer and the top issuer.

7. The method of claim 1, further comprising adding at least one new vote card to the vote card screen for searching the plurality of vote meetings.

8. A computer implemented method for proxy voting, comprising:
   accessing a fund manager system for casting a plurality of votes;
   searching for a plurality of meetings on a vote card list screen;
   clicking on a quick vote in the fund manager system for selecting a plurality of appropriate policies; a plurality of meetings; and providing a plurality of comments; and
   clicking on a vote button for successful voting.

9. The method of claim 8, further comprising a step checking and clicking on an IVZ, where IVZ represents Invesco Ltd, vote history element for listing the vote history of an issuer.

10. The method of claim 8, further comprising selecting at least one flag for providing a plurality of recommendations.

11. The method of claim 8, further comprising sending a proxy vote due report to the fund manager system.

12. The method of claim 8, further comprising storing a plurality of performed activities in a proxy database.

13. The method of claim 12, further comprising sending the stored information to a vendor by a scheduled out process.

14. The method of claim 8, further comprising accepting the plurality of recommendations and the plurality of comments.

15. The method of claim 8, further comprising performing an auto instruct and a vote based on the plurality of policy recommendations.

16. A system for proxy voting, comprising:
   a proxy voting system comprises at least one fund manager system, wherein the fund manager system configured to provide a plurality of delegation of votes of users by a plurality of other users; and
   a global proxy voting tools providing module configured to provide an auto vote process and/or a safety net process, wherein the auto vote process and/or a safety net process associated with an international account for casting a plurality of votes on a respective ballots, wherein the plurality of users mapped to the international account for casting the votes.

17. A system for proxy voting, comprising:
a proxy voting system comprises at least one fund manager system, wherein the fund manager system configured to provide a plurality of delegation of votes of users by a plurality of other users, wherein the plurality of other users comprises a proxy admin team; and
a global proxy voting tools providing module configured to provide an auto vote process and/or a safety net process, wherein the auto vote process and/or a safety net process associated with an international account for casting a plurality of votes on a respective ballots.

18. A system for proxy voting, comprising:
a proxy voting system comprises at least one fund manager system, wherein the fund manager system configured to provide a plurality of delegation of votes of users by a plurality of other users; and
a global proxy voting tools providing module configured to provide an auto vote process and/or a safety net process, wherein the auto vote process and/or a safety net process associated with an international account for casting a plurality of votes on a respective ballots, wherein the global proxy voting tools providing module further comprises a mirror vote process configured for automatically casting the plurality of votes of the ballots based on the vote of the highest rank holder.

19. A system for proxy voting, comprising:
a proxy voting system comprises at least one fund manager system, wherein the fund manager system configured to provide a plurality of delegation of votes of users by a plurality of other users; and
a global proxy voting tools providing module configured to provide an auto vote process and/or a safety net process, wherein the auto vote process and/or a safety net process associated with an international account for casting a plurality of votes on a respective ballots,
wherein the proxy voting system further comprises at least one vendor data system; at least one database; at least one report generating module; at least one proxy admin system; at least one business layer and at least one data access layer; at least one information providing module and at least one information placing module.

* * * * *